S. S. ECCLESTON.
Lifting-Jacks.
No. 134,865.  Patented Jan. 14, 1873.
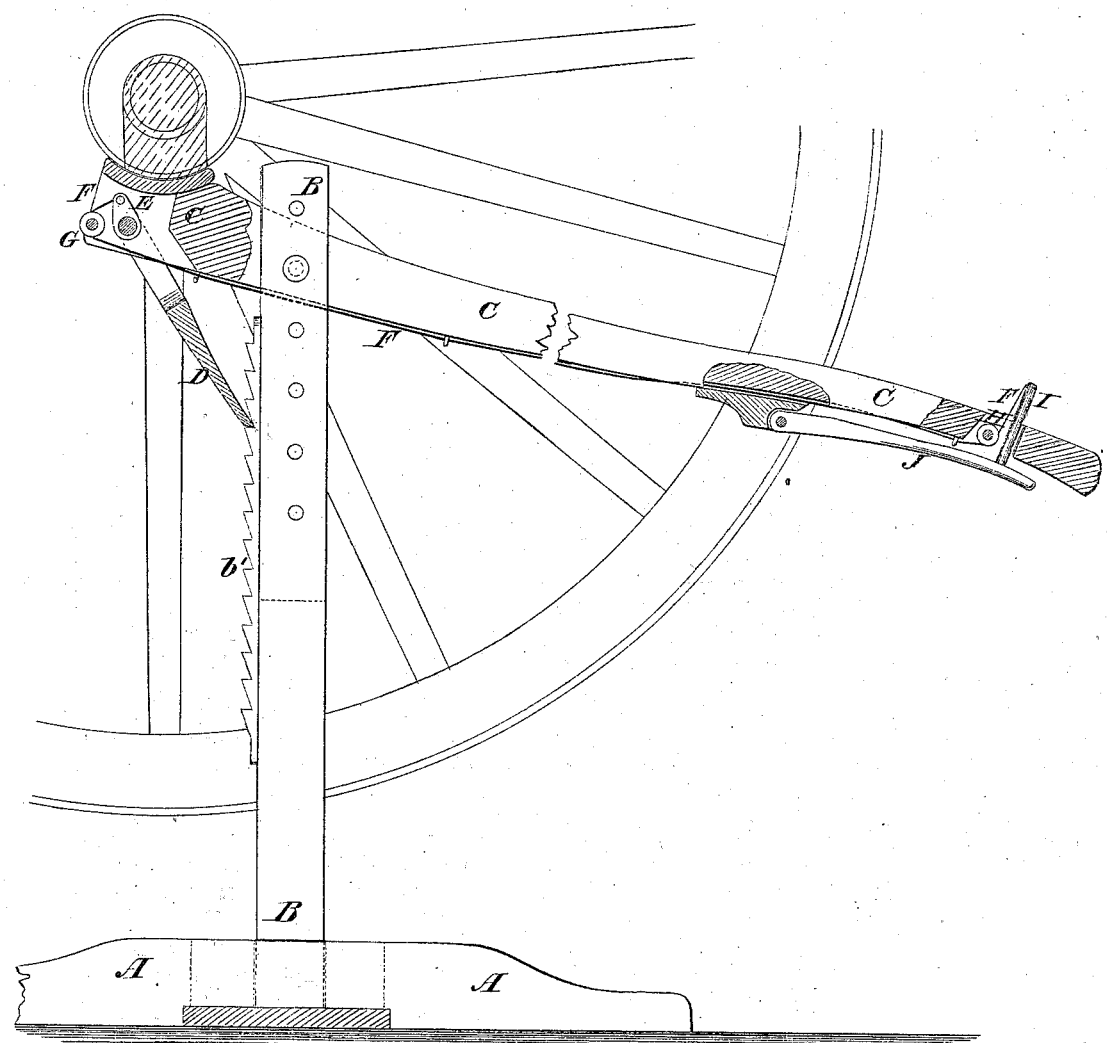

UNITED STATES PATENT OFFICE.

S. SPENCER ECCLESTON, OF SOUTH NEW BERLIN, NEW YORK.

IMPROVEMENT IN LIFTING-JACKS.

Specification forming part of Letters Patent No. 134,865, dated January 14, 1873.

*To all whom it may concern:*

Be it known that I, S. SPENCER ECCLESTON, of South New Berlin, in the county of Chenango and State of New York, have invented a new and useful Improvement in Wagon-Jack, of which the following is a specification:

The figure is a side view of my improved wagon-jack, parts being broken away to show the construction.

My invention relates to an improvement in the class of wagon-jacks whose lifting-lever is provided with a pawl operated by a rod extending to the handle portion thereof; and the improvement consists in the arrangement of parts, as hereinafter described, whereby the hand of the operator is, in practice, applied simultaneously to both the main lifting-lever and the lever for holding the pawl engaged with the toothed rack of the vertical standard.

A represents the base-frame, which is made of such a length and breadth as to give a firm support to the jack. B is the standard, the lower end of which is securely attached to the base-frame A, and which is slotted to receive the operating-lever C, which is pivoted to it by a pin which passes through a hole in the said lever C and standard B, several holes being formed in the said standard B to receive the said pivoting-pin, so that the lever C may be adjusted as the height of the object to be raised may require. Upon the forward side of the standard B are formed, or to it are attached, rack-teeth b', to receive the engaging end of the pawl D, the other end of which enters a slot in the forward end of the lever C, where it is pivoted to said lever C. To the upper or pivoted end of the pawl D is rigidly attached, or upon it is formed, an arm, E, to the upper or free end of which is attached the end of a cord, F, which passes around a guide-pulley, G, pivoted to the forward end of the lever C. The cord F passes through a slot in the upper part of the pawl D, and along the lower side of the lever C, which may be grooved to receive it so that the cord may be out of the way. At the rear part of the lever C the cord F passes around a guide-pulley, H, pivoted in a slot in said lever C, and its end is attached to the upper end of the arm I, which passes up through the slot in the lever C. The lower end of the arm I is rigidly attached to the lever J, which extends along the under side of the lever C, to which its forward end is pivoted, as shown in the figure.

By this construction, when the pawl D is allowed to hang free, its weight tends to draw the lever J downward, which lever J is also drawn downward by its own weight.

In using the jack, the forward end of the lever C is inserted beneath the wagon-axle or other weight to be raised, and by lowering the free end of the said lever the said weight is raised. When the weight has been raised to the desired height, the free end of the lever J is raised, which operates the cord F, and draws the engaging end of the pawl D against the rack-teeth b of the standard B, to hold the weight suspended. When the weight is to be lowered, by lightly lowering the outer end of the lever C, the lever J being left free, the pawl D will drop away from the teeth b' of the standard B, allowing the weight to be lowered.

By this construction the pawl D may be operated from the rear end of the lever C, however long said lever may be, thus allowing the lever C to be made of any required length to obtain any desired leverage.

Having thus described my invention, I claim as new and desire to secure by Letters Patent—

The lever J, hinged to the under side of the lifting-lever C, and provided with the arm I adapted to enter a slot in the latter, the cord F, pulleys H G, pawl D, and standard B b', all constructed, arranged, and operating as shown and described, for the purpose specified.

S. SPENCER ECCLESTON.

Witnesses:
STANFORD C. GIBSON,
J. JAY ECCLESTON.